United States Patent
Trim et al.

(10) Patent No.: US 12,093,975 B2
(45) Date of Patent: Sep. 17, 2024

(54) EMBEDDING ASYNCHRONOUS CONTENT IN TEXT

(71) Applicant: INTERNATIONAL BUSINESS MACHINES CORPORATION, Armonk, NY (US)

(72) Inventors: Craig M. Trim, Ventura, CA (US); John D. Wilson, League City, TX (US); Shikhar Kwatra, San Jose, CA (US); Jeremy R. Fox, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 453 days.

(21) Appl. No.: 17/029,777

(22) Filed: Sep. 23, 2020

(65) Prior Publication Data
US 2022/0092637 A1    Mar. 24, 2022

(51) Int. Cl.
*G06Q 30/0242*    (2023.01)

(52) U.S. Cl.
CPC ................. *G06Q 30/0244* (2013.01)

(58) Field of Classification Search
CPC .......... G06Q 30/0244; G06Q 30/0241; G06Q 30/02; G06Q 50/01; G06Q 10/06; G06Q 10/06311; G06Q 20/18; G06Q 20/356; G06Q 20/381; G06Q 30/0255; G06Q 30/0265; G06Q 30/0266; G06Q 30/0267; G06Q 30/0269; G06Q 50/10; G06Q 30/0207–0277; H04L 2209/38; H04L 9/3239; H04L 9/3297; H04L 9/3247; H04L 67/02; H04L 67/18; H04L 12/16; H04L 51/00; H04L 51/32; H04L 65/00; H04L 65/1083; H04L 65/1089; H04L 65/4015;
(Continued)

(56) References Cited

U.S. PATENT DOCUMENTS

| | | |
|---|---|---|
| 7,860,996 B2 | 12/2010 | Musayev |
| 8,966,523 B1 | 2/2015 | Brueck |

(Continued)

FOREIGN PATENT DOCUMENTS

| | | |
|---|---|---|
| CN | 101404080 A | 4/2009 |
| CN | 110827058 A | 2/2020 |
| CN | 111242696 A | 6/2020 |

OTHER PUBLICATIONS

Mell et al., "The NIST Definition of Cloud Computing", National Institute of Standards and Technology, Special Publication 800-145, Sep. 2011, 7 pages.
(Continued)

*Primary Examiner* — Chinyere Mpamugo
(74) *Attorney, Agent, or Firm* — Michael O'Keefe

(57) ABSTRACT

A method, computer system, and computer program product for asynchronous content embedding is provided. The embodiment may include receiving a plurality of text and data associated with an element of media content. The embodiment may also include displaying the plurality of received text on a display screen. The embodiment may further include caching the received data until all data to fully display the element is received. The embodiment may also include identifying an insertion point for the element within the plurality of displayed text. The embodiment may further include displaying the element at the insertion point.

14 Claims, 6 Drawing Sheets

(58) Field of Classification Search
CPC ......... H04L 67/06; H04L 67/10; H04L 67/22;
H04L 12/12; H04L 12/2816; H04L
12/2823; H04L 12/4625; H04L 65/1006;
H04L 65/105; H04L 67/12; H04L 67/16;
H04L 12/1813; H04L 12/1822; H04L
41/0803; H04L 47/522; H04L 63/083;
H04L 63/0861; H04L 65/1059; H04L
65/60; H04L 65/604; H04L 65/605; H04L
65/80; H04L 67/20; G06F 21/16; G06F
3/0482; G06F 3/04845; G06F 3/0481;
G06F 3/0484; G06F 3/0485; G06F 16/22;
G06F 16/27; G06F 16/9537; G06F 3/011;
G06F 3/04883; G06F 3/16; G06F 3/165;
G06F 3/012; G06F 3/013; G06F 3/0412;
G06F 3/04842; G06F 3/04855; G06F
3/0486; G06F 3/04886; G06F 3/1222;
G06F 3/1238; G06F 9/4411; G06F 9/451;
G06F 11/2284; G06F 11/328; G06F
16/156; G06F 16/162; G06F 16/1727;
G06F 16/211; G06F 16/24573; G06F
16/25; G06F 16/282; G06F 16/41; G06F
16/435; G06F 16/583; G06F 16/7328;
G06F 16/9024; G06F 16/906; G06F
16/93; G06F 16/95; G06F 16/9577; G06F
1/1626; G06F 1/1635; G06F 1/1647;
G06F 1/1656; G06F 1/1658; G06F 1/266;
G06F 1/3287; G06F 1/3296; G06F 21/53;
G06F 21/6218; G06F 2203/04108; G06F
2203/04803; G06F 2203/04808; G06F
2221/2149; G06F 3/03543; G06F 3/038;
G06F 3/048; G06F 3/04812; G06F
3/04815; G06F 3/04817; G06F 3/04847;
G06F 3/0488; G06F 3/0643; G06F 3/12;
G06F 3/1203; G06F 3/1204; G06F
3/1205; G06F 3/1208; G06F 3/1229;
G06F 3/1251; G06F 3/1256; G06F
3/1257; G06F 3/1271; G06F 3/128; G06F
3/14; G06F 3/1415; G06F 3/1423; G06F
3/147; G06F 40/106; G06F 8/38; G06F
8/61; G06F 8/65; G06F 8/71; G06F 8/76;
G06F 9/445; G06F 9/454; G06F 9/54;
G06F 9/547

See application file for complete search history.

(56) References Cited

U.S. PATENT DOCUMENTS

| | | | |
|---|---|---|---|
| 9,027,052 | B2 | 5/2015 | Barhate |
| 9,058,608 | B2 | 6/2015 | Ranganath |
| 2011/0047512 | A1* | 2/2011 | Onogi .................. G06F 3/0482 715/836 |
| 2013/0117129 | A1* | 5/2013 | Brown .................. G06Q 30/02 705/14.66 |
| 2013/0191220 | A1 | 7/2013 | Dent |
| 2014/0136990 | A1* | 5/2014 | Gonnen ................ H04L 51/18 715/752 |
| 2015/0058114 | A1 | 2/2015 | Yi |
| 2015/0324856 | A1 | 11/2015 | Shay |
| 2016/0088369 | A1 | 3/2016 | Terpe |
| 2016/0299654 | A1 | 10/2016 | Mai |

OTHER PUBLICATIONS

Statista.com, Mobile ad spend worldwide 2017, Published by Statista Research Department, Oct. 15, 2016, https://www.statista.com/statistics/280640/mobile-advertising-spending-worldwide/, accessed Jun. 2, 2020, 2 pages.

International Search Report and Written Opinion of International Application No. PCT/CN2021/110112, mailed Nov. 1, 2021, 10 pages.

Trim et al., "Embedding Asynchronous Content in Text," Application and Drawings, Filed on Aug. 2, 2021, 29 Pages, International Application No. PCT/CN2021/110112.

* cited by examiner

EMBEDDING ASYNCHRONOUS CONTENT IN TEXT

BACKGROUND

The present invention relates generally to the field of computing, and more particularly to digital marketing.

Digital marketing relates to an area of marketing that focuses on digital technologies to promote products and services to consumers. The digital technologies closely associated with digital marketing include, but are not limited to, desktop computers, laptop computers, mobile phones, and other platforms that are capable of connecting to the internet and/or displaying information through a graphical user interface. As digital platforms become more entwined in everyday life, a shift to digital marketing from traditional marketing campaigns, such as direct mail marketing, is vital to successful marketing strategies.

Online marketing is a subcategory of digital marketing and advertising that focuses on using the internet to deliver promotional materials to consumers. Digital marketing covers many of the same areas as online marketing. However, digital marketing differs from online marketing in that non-internet channels are employed in digital marketing but not in online marketing.

SUMMARY

According to one embodiment, a method, computer system, and computer program product for asynchronous content embedding is provided. The embodiment may include receiving a plurality of text and data associated with an element of media content. The embodiment may also include displaying the plurality of received text on a display screen. The embodiment may further include caching the received data until all data to fully display the element is received. The embodiment may also include identifying an insertion point for the element within the plurality of displayed text. The embodiment may further include displaying the element at the insertion point.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
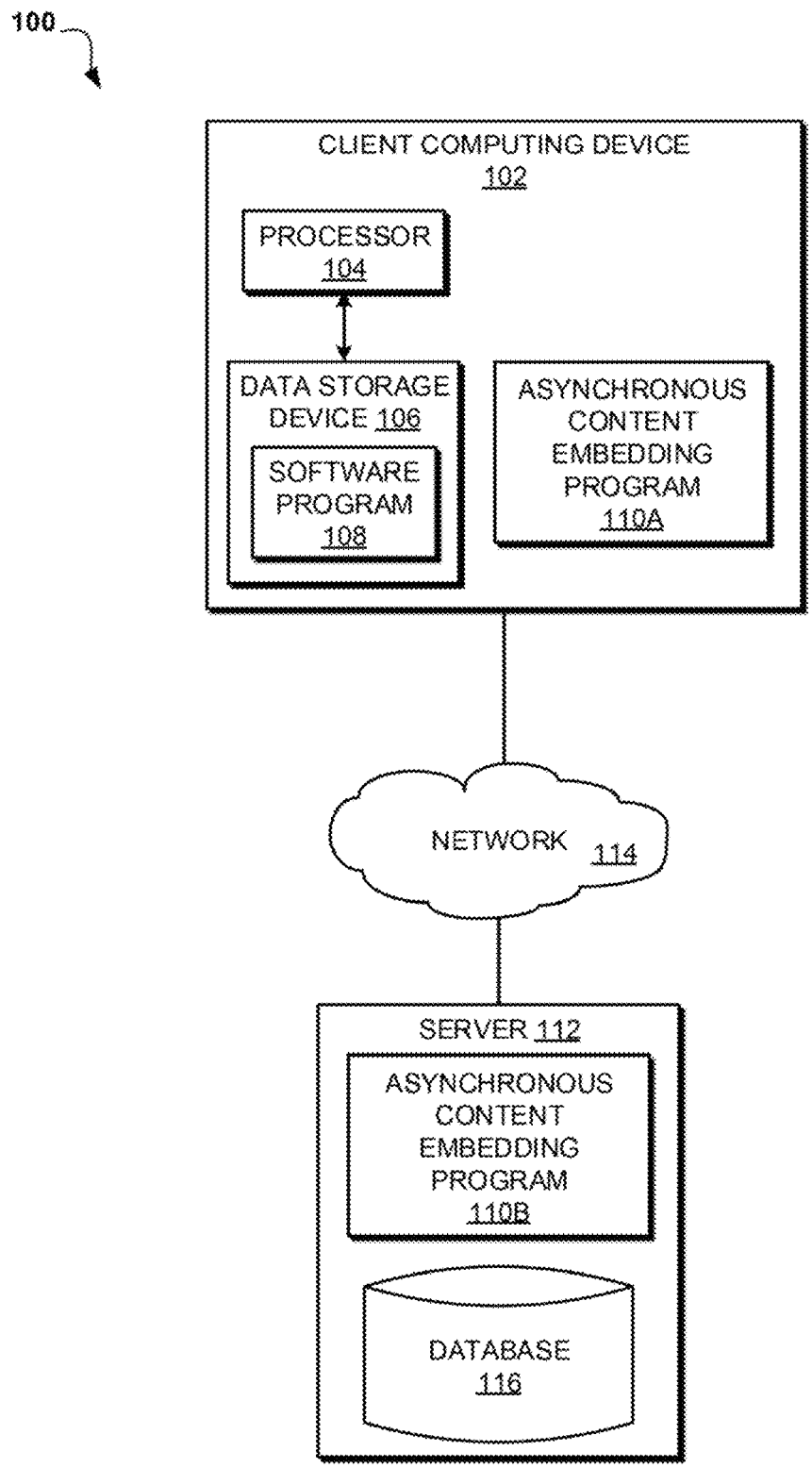
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital marketing. The following described exemplary embodiments provide a system, method, and program product to, among other things, seamlessly insert content into a text stream being viewed on a user device such that the text stream may be read smoothly without jitter or jumping around as a result of content insertion into the current viewing area. Therefore, the present embodiment has the capacity to improve the technical field of digital marketing by improving the user experience when interacting with advertising content and greater likelihood of user engagement with digital advertisements.

As previously described, digital marketing relates to an area of marketing that focuses on digital technologies to promote products and services to consumers. The digital technologies closely associated with digital marketing include, but are not limited to, desktop computers, laptop computers, mobile phones, and other platforms that are capable of connecting to the internet and/or displaying information through a graphical user interface. As digital platforms become more entwined in everyday life, a shift to digital marketing from traditional marketing campaigns, such as direct mail marketing, is vital to successful marketing strategies.

Online marketing is a subcategory of digital marketing and advertising that focuses on using the internet to deliver promotional materials to consumers. Digital marketing covers many of the same areas as online marketing. However, digital marketing differs from online marketing in that non-internet channels are employed in digital marketing but not in online marketing.

Advertisement insertion, the process of presenting marketing materials to a user viewing content, on mobile devices is handled differently than on desktop devices. On a desktop computer, when viewing a well-designed website, advertisements are usually inserted on the sides or at the top of the screen area to allow the text area to be kept intact. Ad insertion timing is variable and depends on various advertisement acquisition threads going to different servers with inherently different latency and throughput. A desktop web interface can allow a smooth and continuous display of scrolling text while the asynchronous advertisements can be displayed when they appear in their own separate screen areas.

On a mobile device, screen surface area is typically too limited to allow advertisement insertion to the side of the text. Therefore, advertisements are typically inserted in-line with the text being displayed. Therefore, when an asynchronous advertisement appears, it is inserted immediately into the middle of the text stream being viewed and can cause major disruption to the user reading the text as text is suddenly shunted out of the way and an advertisement is pushed into the screen viewing area. As such, it may be advantageous to, among other things, utilize a cognitive delayed insertion for advertisements on mobile devices and mobile-type devices, such as tablets, where an advertisement is displayed as an action of the user purposely moving down the text on a display screen.

According to at least one embodiment, a system capable of cognitive delayed insertion may monitor text being displayed in a viewing area of a mobile device or mobile-type device display screen. When data for an image that is to be displayed is received later than the text, the data may be temporarily stored in a cache. The image may not be displayed on the display screen until all data is received and the user starts to scroll down the screen in order to view new text. Upon receiving all data needed to fully display the image and determining the user has scrolled toward new displayed content on the user device display screen, the cached image may be loaded into the new area towards which the user is scrolling the user device display screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to forego displaying images that have been only partially received from third party sites when a user is viewing a site on a user mobile device until the image data is fully received and cached and, then, displaying the image outside of the current viewing area so, when a user scrolls, the image becomes viewable without interrupting the user reading experience.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an asynchronous content embedding program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an asynchronous content embedding program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the asynchronous content embedding program 110A, 110B may be a program capable of receiving text and images from a third party site and displaying both the text and images on a display screen of a user mobile device or a user mobile-type device, such as a tablet, displaying the received text on the display screen when received, caching the received image data until all data for a specific image is received, and, once all data for a specific image is received, cognitively presenting the image to the user on the display screen so the user reading experience is not interrupted but a sudden insertion of the received image. The asynchronous content embedding method is explained in further detail below with respect to FIG. 2.

Figure 2:
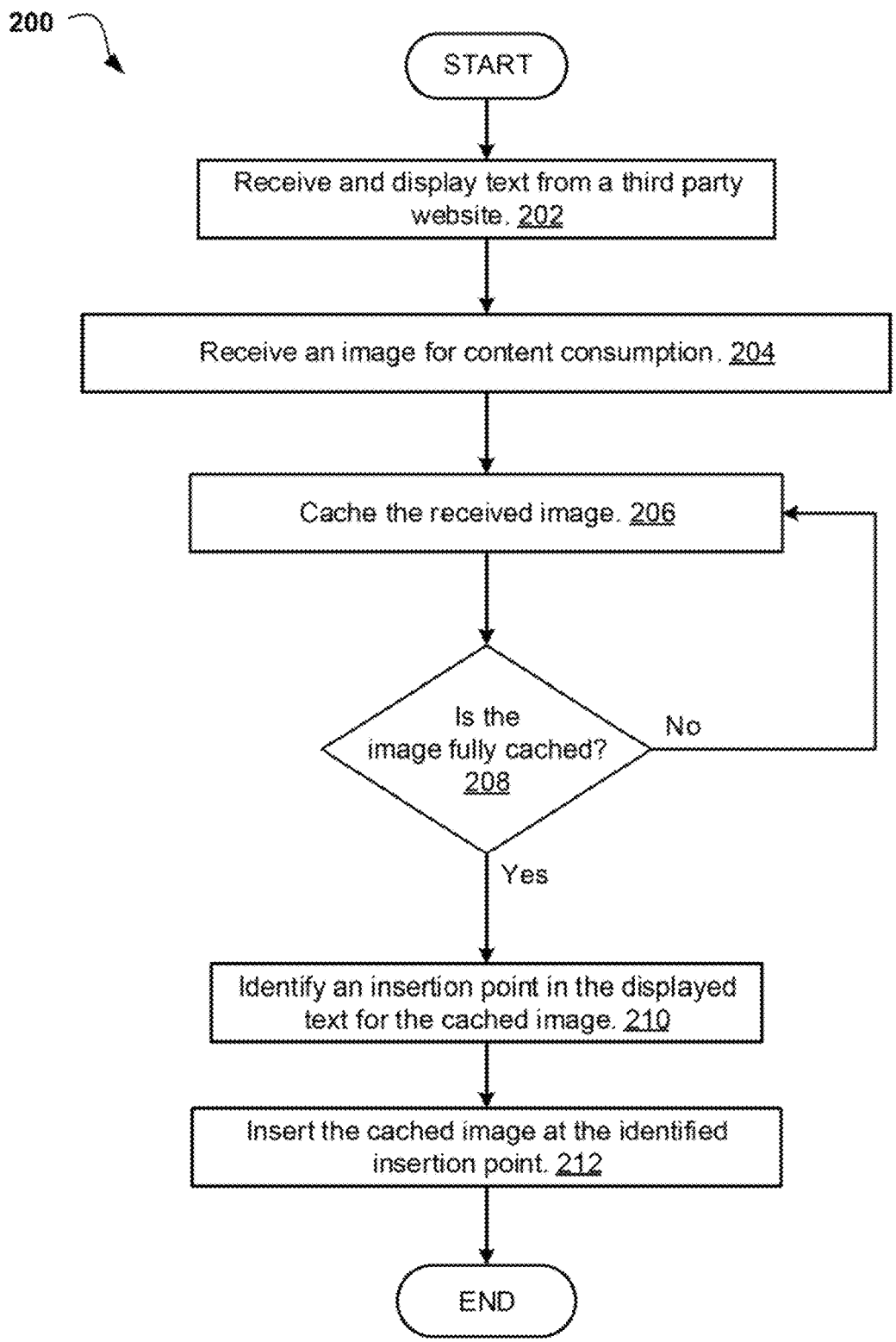
FIG. 2 illustrates an operational flowchart for asynchronous content embedding process according to at least one embodiment.

Referring now to FIG. 2, an operational flowchart illustrating an asynchronous content embedding process 200 is depicted according to at least one embodiment. At 202, the asynchronous content embedding program 110A, 110B receives and displays text from a third party website. When text is received, the asynchronous content embedding program 110A, 110B may proceed with displaying the received text-based fonts on a graphical user interface of a display screen associated with a user device, such as client computing device 102. The asynchronous content embedding program 110A, 110B may optimize the font size of the received text according to preconfigured settings. For example, when a user opens a news article on a smartphone, the asynchronous content embedding program 110A, 110B may receive text that comprises the body of the article. When the text is received, the asynchronous content embedding program 110A, 110B may immediately display the text on the display screen even if surrounding images have not yet been received.

Then, at 204, the asynchronous content embedding program 110A, 110B receives an image for content consumption. While interacting with internet-based media, an advertisement or other image may accompany text. However, since images require the receipt of more data to display properly that text, images may require more time before being capable of full display on a user device display screen. Therefore, once the asynchronous content embedding program 110A, 110B has received and displayed text on a user device, such as client computing device 102, the asynchronous content embedding program 110A, 110B may receive images, such as advertisement images. For example, continuing the above described scenario, when the asynchronous content embedding program 110A, 110B receives and displays text associated with the user selected news article, the asynchronous content embedding program 110A, 110B may also receive images associated with the article, such as advertisements and pictures to aid user understanding of the article. In at least one embodiment, the reception of the image may occur, at least initially, concurrently to the reception of the text described in step 202.

Next, at 206, the asynchronous content embedding program 110A, 110B caches the received advertising image. As the asynchronous content embedding program 110A, 110B receives the image, the data to compile and display the image may not be receive quick enough to insert the image into the text without the user viewing experience being interrupted. Therefore, the asynchronous content embedding program 110A, 110B may delay the insertion of the image so that insertion can be performed after receipt of the entire image. While receiving the image, the asynchronous content embedding program 110A, 110B may cache the image either locally in memory storage of the client computing device 102 or remotely in a repository, such as database 116, in the server 112.

Then, at 208, the asynchronous content embedding program 110A, 110B determines whether the image is fully cached. The asynchronous content embedding program 110A, 110B may determine the image is fully cached when all data packets or information to compile the image have been received and/or the image is otherwise ready for presentation to the user on a graphical user interface of a user device display screen. If the asynchronous content embedding program 110A, 110B determines the advertising image is not fully cached yet (step 208, "No" branch), then the asynchronous content embedding process 200 may return to step 206 to continue caching the received image data as it is received. If the asynchronous content embedding program 110A, 110B determines the advertising image is fully cached (step 208, "Yes" branch), then the asynchronous content embedding process 200 may proceed to step 210 to identify an insertion point in the displayed text for the cached advertising image.

Next, at 210, in response to determining the image is fully cached, the asynchronous content embedding program 110A, 110B identifies an insertion point in the displayed text for the cached advertising image. Once the received image is fully cached and ready for insertion into the displayed text, the asynchronous content embedding program 110A, 110B may identified a point within the text to insert the image. Typically, an image is inserted into displayed text at a defined point once receipt of image data is initially begun. Distinguishably, the asynchronous content embedding program 110A, 110B may calculate a point at which to insert the cached image. Utilizing gaze detection techniques to track a user's movements and viewing on a display screen, the asynchronous content embedding program 110A, 110B may calculate the insertion point to be outside the current display screen viewing area so as to minimize jitter impact on the user viewing the displayed text. For example, the asynchronous content embedding program 110A, 110B may complete caching of an image once the user has finished reading the end of a paragraph of text. Prior to the user scrolling down on a user device touchscreen so as to advance to the next paragraph of an article, which is currently outside of the display screen, the asynchronous content embedding program 110A, 110B may insert the cached image so, when the user scrolls down, the user views the now-displayed image prior to viewing the next paragraph of the article.

In at least one embodiment, the insertion point calculated by the asynchronous content embedding program 110A, 110B may be both spatially relevant and temporally relevant. For example, the insertion point may relate to both a place in an article as well as when during a user's viewing of the article an image may be inserted. Factoring temporality into the insertion point enables the asynchronous content embedding program 110A, 110B to conserve system resources doing so limits the number of images loaded into a text at a single time as well as taking into account not all image may need to be loaded should a user exit the text before advancing to an image. For example, loading multiple images to a news article at a single time may be burdensome on the processing capacity of some devices. Therefore, limiting loading to a single image at a time may relieve some burden. Similarly, calculating an insertion point as a location in an article and the predicted time at which a user may read to calculated location may allow the asynchronous content embedding program 110A, 110B to conserve resources expended in loading the image to an article in the event the user exits the article prior to reading to the location or before the predicted time has expired. In at least one embodiment, the predicted time may be calculated using a H/W 555 timer operating from the user device OS oscillator clock, or a software time pre-programmed or programmed on-the-fly via a gaze detection injection technique. The prediction may utilize gaze detection techniques and a pointer which may monitor a user's active reading location on the user device display screen.

Then, at 212, the asynchronous content embedding program 110A, 110B inserts the cached advertising image at the identified insertion point. Once the asynchronous content embedding program 110A, 110B has determined an insertion point at which to place the cached image, the asynchronous content embedding program 110A, 110B may load the image from cache memory to the identified insertion point.

In at least one embodiment, the asynchronous content embedding program 110A, 110B may capture a user reaction to the displayed content in order to mine metrics for improvement of the asynchronous content embedding program 110A, 110B through machine learning. The user reaction may be captured through sensors associated with or communicatively coupled with the client computing device 102, such as a microphone or a wearable smart device. For example, a microphone associated with a user smartphone may capture the user commenting on the insertion of the image and a jitter in the text that the user was reading to determine that the image insertion point may need improving and that the current calculated insertion point may not be adequate. In at least one other embodiment, the effectiveness of content placement may be measured with two like groups to determine the effectiveness of content arrival placement to improve the user experience. The two like groups may be determined based on a statistical average between the two groups being within a preconfigured measure so as to consider the two groups "alike". For example, two advertisements may be considered similar based on the content within the advertisements or the structure of the displayed advertisement and, therefore, used at the same insertion point.

In at least one embodiment, the asynchronous content embedding program 110A, 110B may immediately insert the image at the identified insertion point. However, in at least one other embodiment, the asynchronous content embedding program 110A, 110B may calculate a time at which insertion of the image may be most opportune to minimize the impact on user reading accessibility. For example, the asynchronous content embedding program 110A, 110B may predict that the time at which the least impact on the user's reading is observed as the moment the user finishes a paragraph or a section of a new article.

Figures 3A, 3B, 3C:
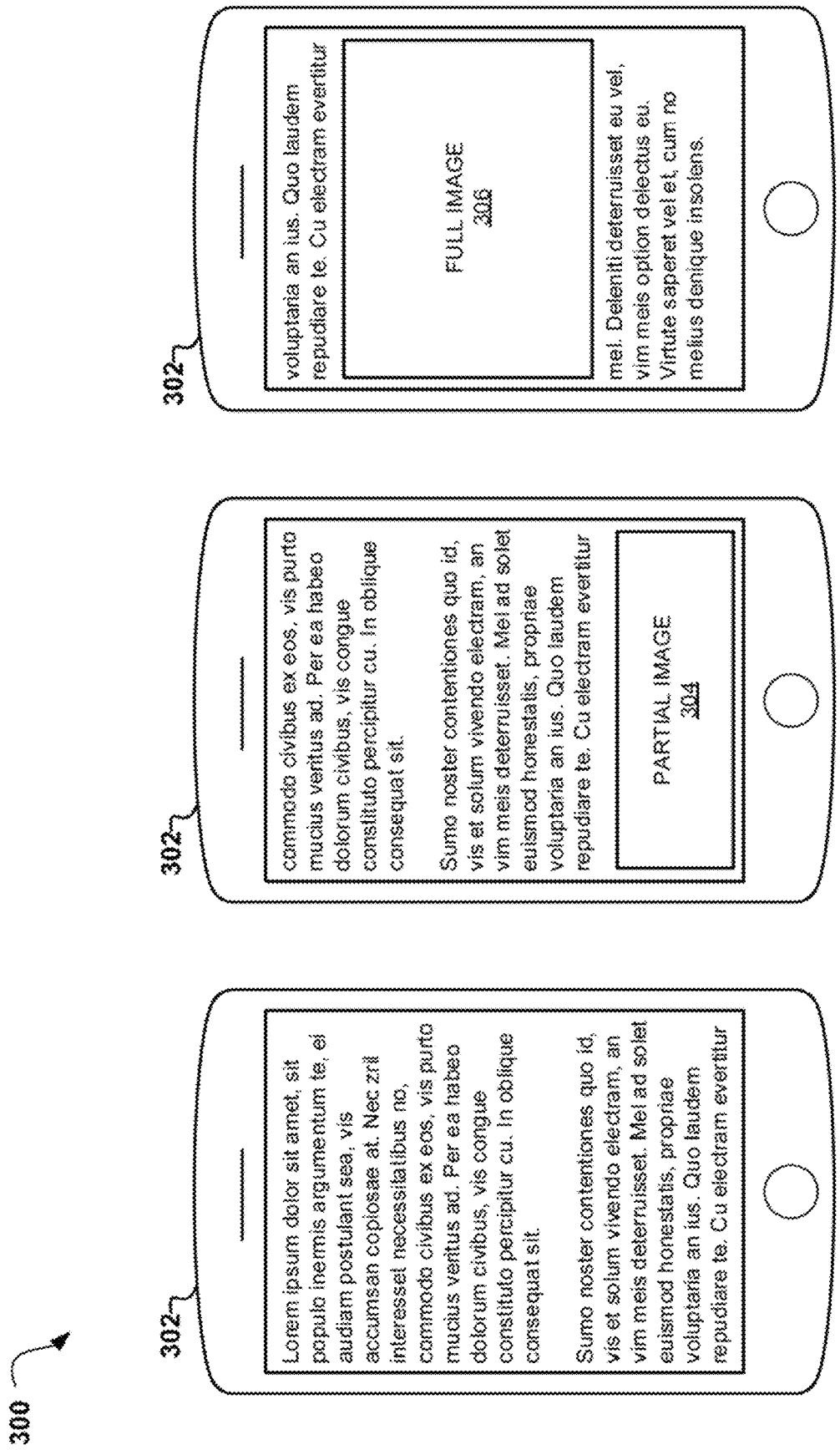
FIGS. 3A-3C depict block diagrams of example embodiments of asynchronous content embedding according to at least one embodiment.

Referring now to FIGS. 3A-3C, block diagrams of example embodiments of asynchronous content embedding is depicted, according to at least one embodiment. FIG. 3A depicts a user device 302, which may be substantially similar to client computing device 102, displaying text of which the user is reading. In FIG. 3A, the asynchronous content embedding program 110A, 110B may be receiving and caching image data and calculating an insertion point for the image upon successfully receiving all data for displaying the image. For purposes of this example, the asynchronous content embedding program 110A, 110B may calculate the insertion point outside the display screen of the user device 302. FIG. 3B depicts the display screen of the user device 302 once the asynchronous content embedding program 110A, 110B has inserted the image off screen after the text "Cu electram evertitur" and the user has scrolled lower in the text so that partial image 304 is viewable on the display screen. FIG. 3C depicts the display screen of the user device 302 once the user has scrolled even further and the partial image 304 is not fully displayed as full image 306. Upon fully displaying full image 306, the asynchronous content embedding program 110A, 110B may continue the text that follows where there article left off. In this situation, the text where the article left off "Cu electram evertitur" before image insertion off screen is followed by "mel. Deleniti deterruisset eu vel, vim meis option delectus eu." after the full image 306 has been scrolled past by the user.

It may be appreciated that FIGS. 2 and 3 provide only an illustration of one implementation and does not imply any limitations with regard to how different embodiments may be implemented. Many modifications to the depicted environments may be made based on design and implementation requirements. For illustrative purposes, an image has been used to describe the content received, cached, and inserted into a text-based display. However, the asynchronous content embedding program 110A, 110B may be capable of performing the described method with any element capable of display on a graphical user interface that requires the reception of data over a network 114. In embodiments, the element may be an image, a video, a graphics interchange format (GIF) file, a table, a chart, a banner, a header, a footer, and text.

In at least one other embodiment, the entirety of the user device display screen may be fully occupied by non-text-based media content, such as a video advertisement, while the user is scrolling through a simply HTML format of text. In such scenarios, a time buffer may generate the media content once the asynchronous content embedding program 110A, 110B locates the user's context and content pixel. Upon viewing completion of the media content, the asynchronous content embedding program 110A, 110B may return the earlier text to the display screen with a highlighted word or graphical pointer directing the user's attention to the location of where the asynchronous content embedding program 110A, 110B determined the user's was last before displaying the media content in order to maintain a seamless reading experience for the user. For example, the asynchronous content embedding program 110A, 110B may highlight a particular work so that the user can identify the location where the user left off or the asynchronous content embedding program 110A, 110B may re-route the user to a particular location on the display screen with a blinking dotted bar to show the user the current reading location based on eye gaze detection data.

Figure 4:
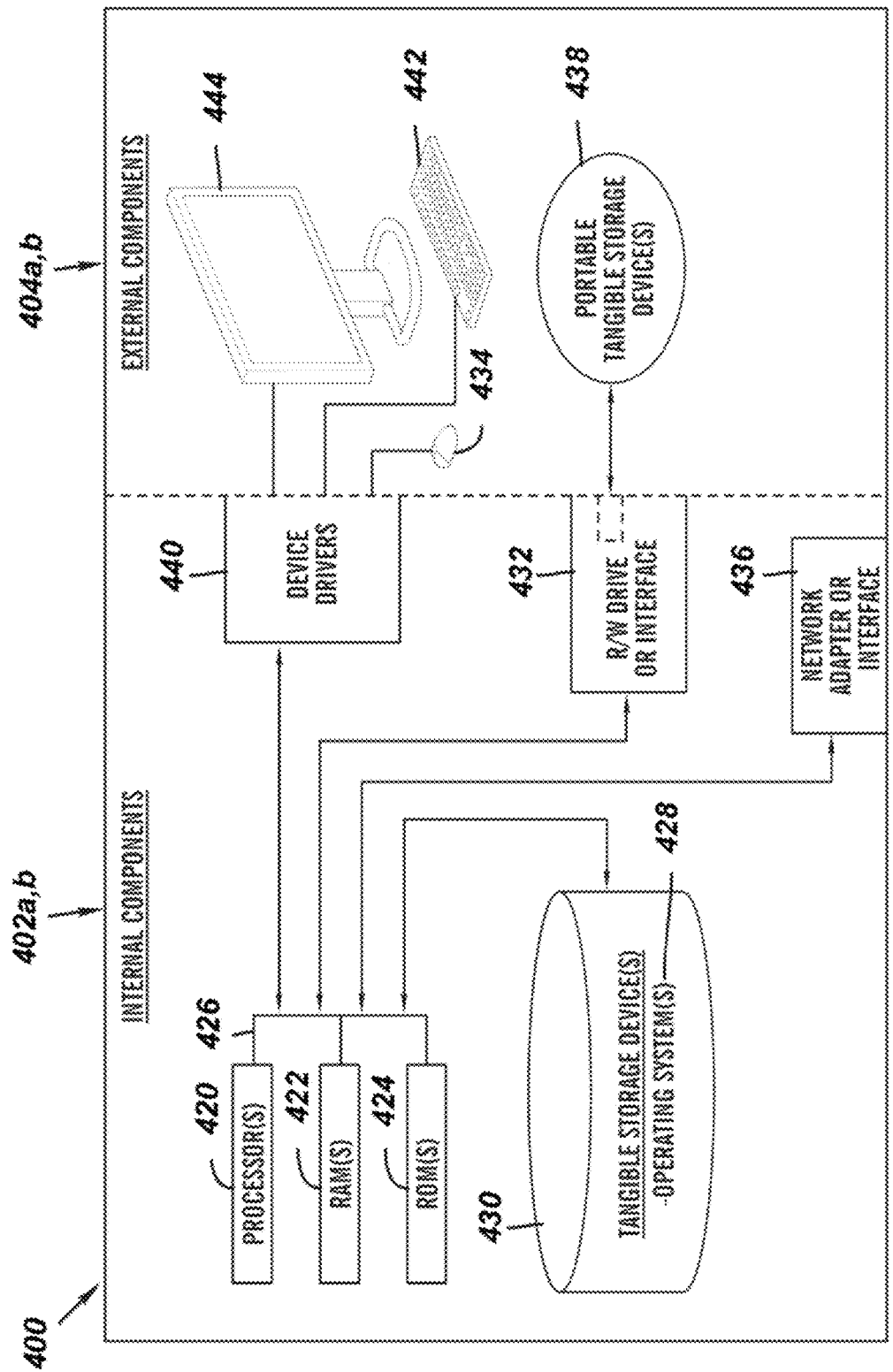
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the asynchronous content embedding program 110A in the client computing device 102 and the asynchronous content embedding program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the asynchronous content embedding program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the asynchronous content embedding program 110A in the client computing device 102 and the asynchronous content embedding program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the asynchronous content embedding program 110A in the client computing device 102 and the asynchronous content embedding program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402*a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
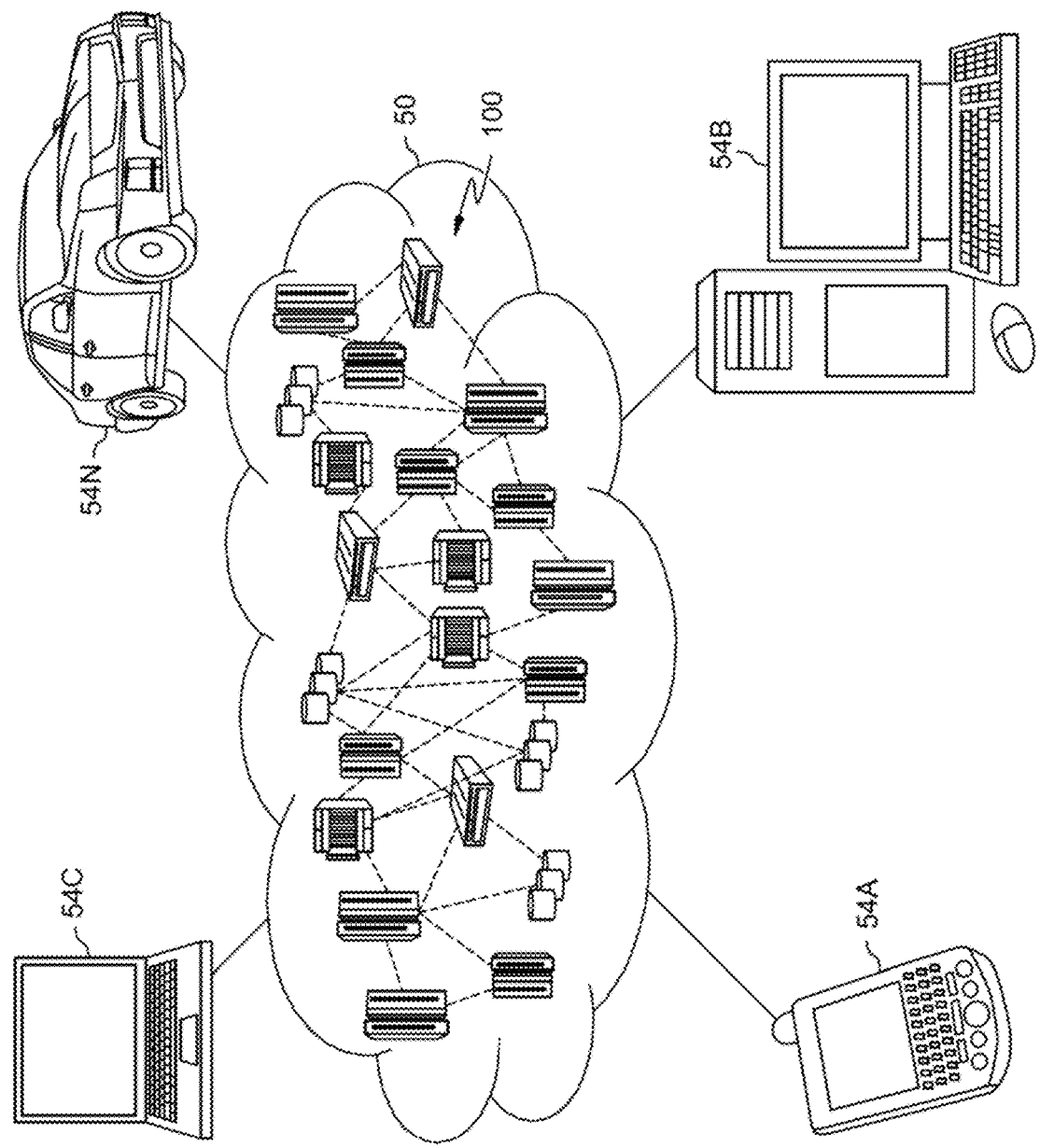
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
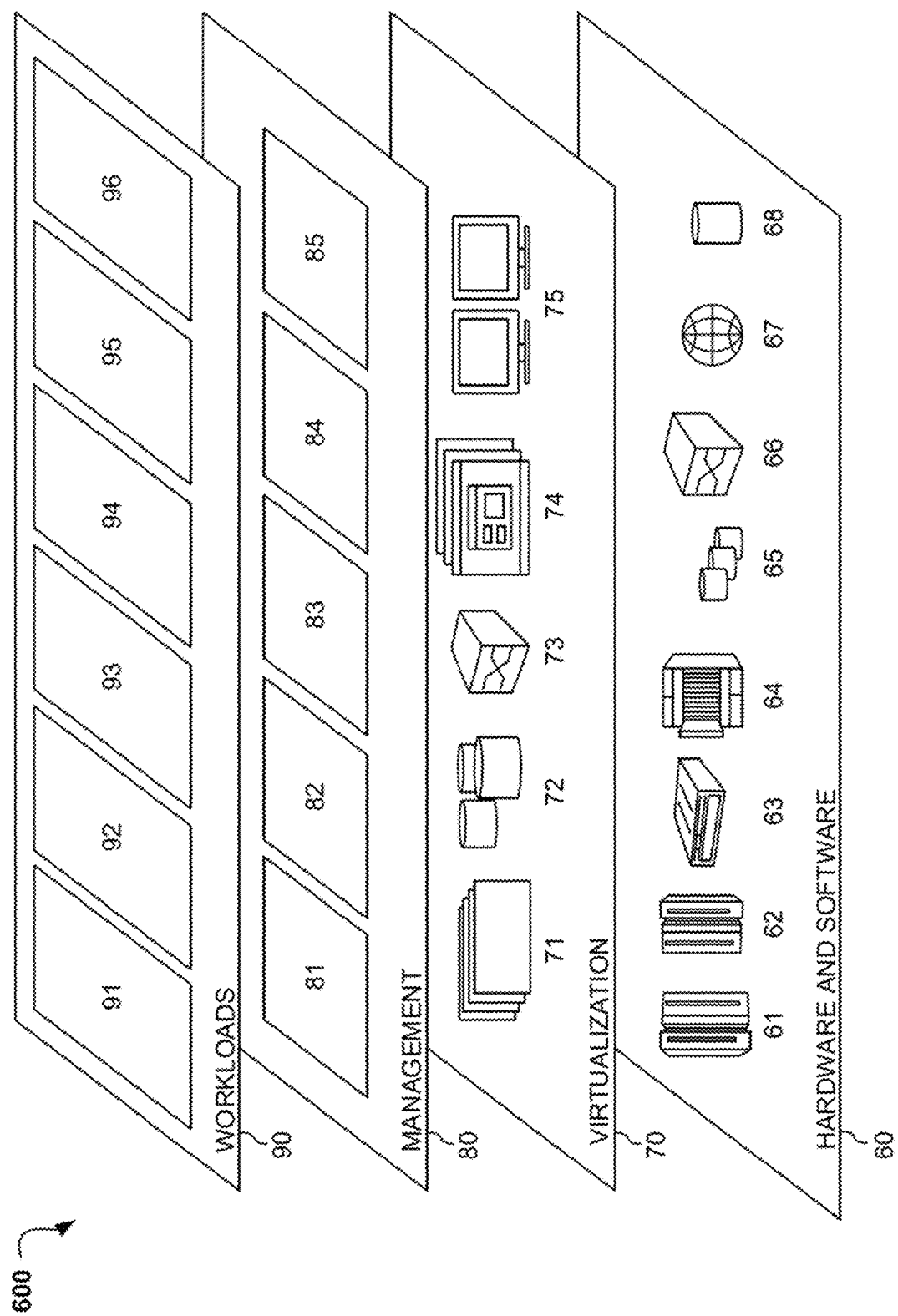
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asynchronous content embedding 96. Asynchronous content embedding 96 may relate to receiving text and media content over a network 114, displaying the text when received but caching the media content until all data related to a single element of the media content is received, and inserting the fully received element of media content into the displayed text at a point where the insertion will not disrupt a user experience with the displayed text.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   receiving, by a processor, a plurality of text and data associated with one or more elements of media content;
   displaying at least a portion of the plurality of received text on a display screen;
   caching the received data until all data to fully display an element is received;
   identifying an insertion point and an insertion time for each element within the plurality of displayed text, wherein the insertion point is outside of a current view of the display screen, and wherein each insertion point is identified as a location within the plurality of text; and wherein the insertion time is a predicted time at which a user reaches the location while reading the plurality of text; and
   displaying each element at the corresponding identified insertion point.

2. The method of claim 1, wherein the insertion point is identified as a place within the plurality of displayed text where insertion of the element will cause little disruption to a user reading experience.

3. The method of claim 1, wherein the insertion point is identified both spatially and temporally.

4. The method of claim 1, further comprising:
   capturing a user reaction to displaying the element at the insertion point; and
   improving the identification of the insertion point of other elements based on the captured user reaction.

5. The method of claim 1, wherein a format of the element is selected from a group consisting of an image, a video, a graphics interchange format (GIF) file, a table, a chart, a banner, a header, a footer, and text.

6. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a plurality of text and data associated with one or more elements of media content;
   displaying at least a portion of the plurality of received text on a display screen;
   caching the received data until all data to fully display an element is received;
   identifying an insertion point and an insertion time for each element within the plurality of displayed text, wherein the insertion point is outside of a current view of the display screen, and wherein each insertion point is identified as a location within the plurality of text; and wherein the insertion time is a predicted time at which a user reaches the location while reading the plurality of text; and
   displaying each element at the corresponding identified insertion point.

7. The computer system of claim 6, wherein the insertion point is identified as a place within the plurality of displayed text where insertion of the element will cause little disruption to a user reading experience.

8. The computer system of claim 6, wherein the insertion point is identified both spatially and temporally.

9. The computer system of claim 6, further comprising:
   capturing a user reaction to displaying the element at the insertion point; and improving the identification of the insertion point of other elements based on the captured user reaction.

10. The computer system of claim 6, wherein a format of the element is selected from a group consisting of an image, a video, a graphics interchange format (GIF) file, a table, a chart, a banner, a header, a footer, and text.

11. A computer program product, the computer program product comprising:
one or more computer-readable tangible storage medium and program instructions stored on at least one of the one or more tangible storage medium, the program instructions executable by a processor capable of performing a method, the method comprising:
receiving a plurality of text and data associated with one or more elements of media content;
displaying at least a portion of the plurality of received text on a display screen;
caching the received data until all data to fully display an element is received;
identifying an insertion point and an insertion time for each element within the plurality of displayed text, wherein the insertion point is outside of a current view of the display screen, and wherein each insertion point is identified as a location within the plurality of text; and wherein the insertion time is a predicted time at which a user reaches the location while reading the plurality of text; and
displaying each element at the corresponding identified insertion point.

12. The computer program product of claim 11, wherein the insertion point is identified as a place within the plurality of displayed text where insertion of the element will cause little disruption to a user reading experience.

13. The computer program product of claim 11, wherein the insertion point is identified both spatially and temporally.

14. The computer program product of claim 11, further comprising:
capturing a user reaction to displaying the element at the insertion point; and
improving the identification of the insertion point of other elements based on the captured user reaction.

* * * * *